(12) United States Patent
Liao et al.

(10) Patent No.: US 11,359,723 B2
(45) Date of Patent: Jun. 14, 2022

(54) SEALING STRUCTURE

(71) Applicants: Tai-An Liao, New Taipei (TW); Kao-Hsiung Liao, New Taipei (TW); Ping-Yuan Liao, New Taipei (TW)

(72) Inventors: Tai-An Liao, New Taipei (TW); Kao-Hsiung Liao, New Taipei (TW); Ping-Yuan Liao, New Taipei (TW)

( * ) Notice: Subject to any disclaimer, the term of this patent is extended or adjusted under 35 U.S.C. 154(b) by 198 days.

(21) Appl. No.: 16/994,729

(22) Filed: Aug. 17, 2020

(65) Prior Publication Data

US 2021/0140543 A1  May 13, 2021

(30) Foreign Application Priority Data

Nov. 8, 2019 (TW) ................................. 108140551

(51) Int. Cl.
*B65D 81/05* (2006.01)
*F16J 15/10* (2006.01)

(52) U.S. Cl.
CPC .......... *F16J 15/104* (2013.01); *B65D 81/052* (2013.01)

(58) Field of Classification Search
CPC ............................. F16J 15/104; B65D 81/052
See application file for complete search history.

(56) References Cited

U.S. PATENT DOCUMENTS

| | | | | |
|---|---|---|---|---|
| 7,695,786 B2 * | 4/2010 | Liao | ...................... | B65D 81/052 383/44 |
| 9,138,960 B1 * | 9/2015 | Liao | ......................... | B32B 7/05 |
| 9,724,902 B2 * | 8/2017 | Liao | ....................... | B65D 31/14 |
| 2007/0186994 A1 * | 8/2007 | Koyanagi | ............ | B65D 31/145 141/302 |
| 2008/0080792 A1 * | 4/2008 | Liao | ...................... | B65D 81/052 383/3 |
| 2008/0118680 A1 * | 5/2008 | Liao | ...................... | B65D 81/052 428/34.1 |
| 2009/0155507 A1 * | 6/2009 | Liao | ....................... | F16K 15/147 137/511 |
| 2009/0173649 A1 * | 7/2009 | Liao | ...................... | B65D 81/052 206/326 |
| 2009/0196531 A1 * | 8/2009 | Liao | ...................... | B65D 31/145 383/44 |

(Continued)

FOREIGN PATENT DOCUMENTS

| | | | | |
|---|---|---|---|---|
| JP | 2012025488 A | * | 2/2012 | ........... B65D 31/145 |
| JP | 2014151970 A | * | 8/2014 | ........... B65D 81/052 |

*Primary Examiner* — Eugene G Byrd
(74) *Attorney, Agent, or Firm* — Li & Cai Intellectual Property (USA) Office

(57) ABSTRACT

A sealing structure including a first inner layer unit, a second inner layer unit, a first outer layer unit, and a second outer layer unit is provided. The second inner layer unit and the first inner layer unit are partially connected to each other through a connection manner, so as to form a gas delivery structure that includes a plurality of first stop barriers, a plurality of second stop barriers, and a runner. The second outer layer unit and the first outer layer unit are partially connected to each other through the connection manner, so as to form a first closed pattern, a second closed pattern, a plurality of interval patterns and a plurality of non-continuous patterns. Each of the plurality of first stop barriers and each of the plurality of second stop barriers are connected to one of the plurality of interval patterns respectively.

10 Claims, 8 Drawing Sheets

(56) References Cited

U.S. PATENT DOCUMENTS

| | | | | |
|---|---|---|---|---|
| 2011/0127189 A1* | 6/2011 | Liao | B65D 81/052 | 206/521 |
| 2011/0233101 A1* | 9/2011 | Baines | B31D 5/0073 | 206/522 |
| 2013/0129259 A1* | 5/2013 | Liao | B65D 81/052 | 383/3 |
| 2013/0206259 A1* | 8/2013 | Liao | B65D 81/052 | 137/561 A |
| 2013/0292289 A1* | 11/2013 | Zhang | B65D 81/052 | 206/522 |
| 2013/0313152 A1* | 11/2013 | Liao | B65D 25/205 | 206/522 |
| 2014/0034148 A1* | 2/2014 | Liao | B65D 81/03 | 137/223 |
| 2016/0058218 A1* | 3/2016 | Yoshifusa | B32B 15/00 | 428/12 |
| 2017/0045151 A1* | 2/2017 | Nie | F16K 15/202 | |
| 2017/0369224 A1* | 12/2017 | Wang | B29C 65/72 | |
| 2018/0093809 A1* | 4/2018 | Zhang | B65D 83/0055 | |
| 2019/0077567 A1* | 3/2019 | Ye | B29C 66/73921 | |
| 2019/0308791 A1* | 10/2019 | Bates | B65D 81/052 | |

\* cited by examiner

SEALING STRUCTURE

CROSS-REFERENCE TO RELATED PATENT APPLICATION

This application claims the benefit of priority to Taiwan Patent Application No. 108140551, filed on Nov. 8, 2019. The entire content of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a sealing structure, and more particularly to a sealing structure having a design that prevents gas leakage.

BACKGROUND OF THE DISCLOSURE

The transportation and logistics industry is prospering with the progression of society, and it is strongly required to provide better packaging and protection for transported goods. Therefore, inflatable structures are developed to buffer external forces. By having the inflatable structures filled with air to form air columns, goods can be effectively protected from shaking and violent movement.

However, there are still flaws in the conventional inflatable structures. When external gas is guided into the inflatable structures through air introducing channels for inflation, part of the gas that has already filled inside the inflatable structures can still be leaked to the outside through the air introducing channels, causing the gas columns formed by the inflatable structures to be unable to provide a fully effective buffering effect.

SUMMARY OF THE DISCLOSURE

In response to the above-referenced technical inadequacies, the present disclosure provides a sealing structure.

In one aspect, the present disclosure provides a sealing structure including a first inner layer unit, a second inner layer unit, a first outer layer unit, and a second outer layer unit. The second inner layer unit and the first inner layer unit are partially connected to each other through a connection manner, so as to form at least one gas delivery structure. The at least one gas delivery structure includes a plurality of first stop barriers, a plurality of second stop barriers that are disposed in alternation with the first stop barriers, and a runner that is in contact with the plurality of first stop barriers and the plurality of second stop barriers. The first outer layer unit is adjacent to the first inner layer unit. The second outer layer unit corresponds to the first outer layer unit, and the second outer layer unit and the first outer layer unit are partially connected to each other through the connection manner, so as to form a first closed pattern, a second closed pattern, a plurality of interval patterns and a plurality of non-continuous patterns. The first outer layer unit and the second outer layer unit affix the first inner layer unit and the second inner layer unit between the first outer layer unit and the second outer layer unit through the plurality of non-continuous patterns, and the first outer layer unit and the second outer layer unit form a supply channel through the first closed pattern and the plurality of non-continuous patterns, and the supply channel is communicated with a first end of the runner. The first outer layer unit and the second outer layer unit form at least one gas storing space through two of the plurality of interval patterns that are adjacent to each other, one of the plurality of non-continuous patterns corresponding thereto, and the second closed pattern, and a second end of the runner is communicated with the at least one gas storing space. One of the plurality of first stop barriers is connected to one of the plurality of interval patterns, a first concave side of the one of the plurality of first stop barriers and the one of the plurality of interval patterns form a first retention space therebetween, and the first concave side faces toward the second end of the runner. One of the plurality of second stop barriers is connected to another one of the plurality of interval patterns, a second concave side of the one of the plurality of second stop barriers and the another one of the plurality of interval patterns form a second retention space therebetween, and the second concave side faces toward the second end of the runner.

One of the advantages of the present disclosure is that the sealing structure is able to prevent gas inside from leaking out through the supply channel.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
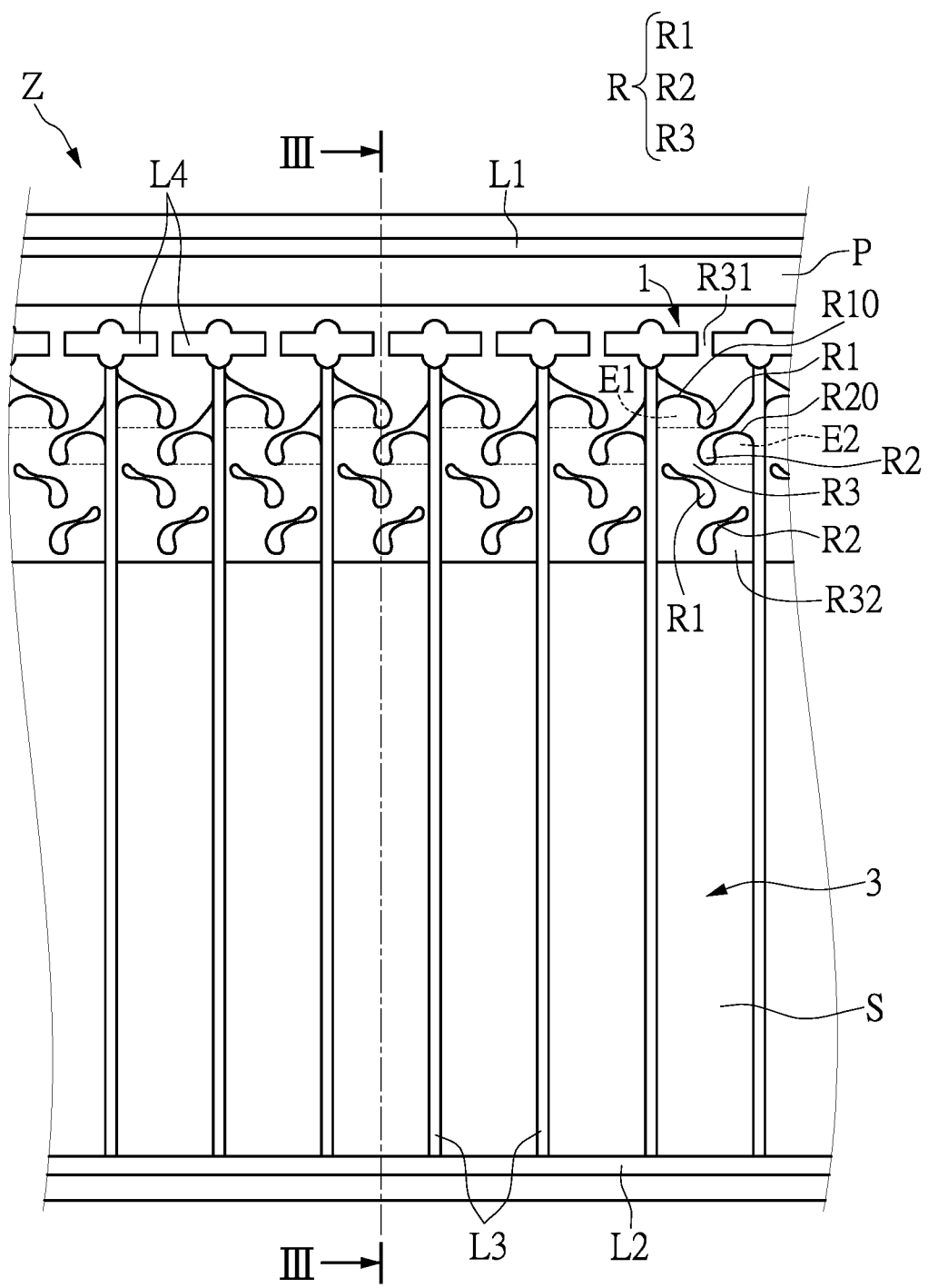
FIG. 1 is a fragmentary structural schematic view of a sealing structure in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

References are made to FIG. 1 to FIG. 4, where a sealing structure Z is provided by the present disclosure. As shown in the figures, the sealing structure Z includes a first inner layer unit 1, a second inner layer unit 2, a first outer layer unit 3, and a second outer layer unit 4. The second inner layer unit 2 and the first inner layer unit 1 are partially connected to each other through a connection manner, so as to form at least one gas delivery structure R. The at least one gas delivery structure R includes a plurality of first stop barriers R1, a plurality of second stop barriers R2 that are disposed in alternation with the first stop barriers R1, and a runner R3 that is in contact with the plurality of first stop barriers R1 and the plurality of second stop barriers R2. The first outer layer unit 3 is adjacent to the first inner layer unit 1. The second outer layer unit 4 corresponds to the first outer layer unit 3, and the second outer layer unit 4 and the first outer layer unit 3 are partially connected to each other through the connection manner, so as to form a first closed pattern L1, a second closed pattern L2, a plurality of interval patterns L3 and a plurality of non-continuous patterns L4. The first outer layer unit 3 and the second outer layer unit 4 affix the first inner layer unit 1 and the second inner layer unit 2 between the first outer layer unit 3 and the second outer layer unit 4 through the plurality of non-continuous patterns L4, and the first outer layer unit 3 and the second outer layer unit 4 form a supply channel P through the first closed pattern L1 and the plurality of non-continuous patterns L4, and the supply channel P is communicated with a first end R31 of the runner R3. The first outer layer unit 3 and the second outer layer unit 4 form at least one gas storing space S through two of the plurality of interval patterns L3 that are adjacent to each other, one of the plurality of non-continuous patterns L4 corresponding thereto, and the second closed pattern L2. A second end R32 of the runner R3 is communicated with the at least one gas storing space S. One of the plurality of first stop barriers R1 is connected to one of the plurality of interval patterns L3, a first concave side R10 of the one of the plurality of first stop barriers R1 and the one of the plurality of interval patterns L3 forms a first retention space E1 therebetween, and the first concave side R10 faces toward the second end R32 of the runner R3. One of the plurality of second stop barriers R2 is connected to another one of the plurality of interval patterns L3, a second concave side R20 of the one of the plurality of second stop barriers R2 and the another one of the plurality of interval patterns L3 forms a second retention space E2 therebetween, and the second concave side R20 faces toward the second end R32 of the runner R3.

Specifically speaking, the sealing structure Z of the present disclosure includes the first inner layer unit 1, the second inner layer unit 2, the first outer layer unit 3, and the second outer layer unit 4. A material of the sealing structure Z can be a transparent thin film, but the present disclosure is not limited thereto. The first outer layer unit 3 and the second outer layer unit 4 are partially connected to each other through a connection manner, such as thermal welding, hot sealing, and hot pressing, so as to form the first closed pattern L1 at a top of the first outer layer unit 3 and the second outer layer unit 4, form the second closed pattern L2 at a bottom of the first outer layer unit 3 and the second outer layer unit 4, and form the plurality of interval patterns L3 and the plurality of non-continuous patterns L4 between the first closed pattern L1 and the second closed pattern L2. The plurality of interval patterns L3 are perpendicular to the first closed pattern L1 and the second closed pattern L2.

The first inner layer unit 1 and the second inner layer unit 2 are positioned between the first outer layer unit 3 and the second outer layer unit 4. The first inner layer unit 1 and the second inner layer unit 2 are partially connected to each other through the connection manner, such as heat sealing and hot pressing, so as to form the at least one gas delivery structure R. The plurality of first stop barriers R1 and the plurality of second stop barriers R2 are formed after the first inner layer unit 1 and the second inner layer unit 2 are connected to each other, and the plurality of first stop barriers R1 and the plurality of second stop barriers R2 are disposed corresponding to each other. Each of the plurality of first stop barriers R1 has the first concave side R10, the first concave side R10 faces toward the second end R32 of the runner R3, and a side of each of the plurality of first stop barriers R1 that is opposite to the first concave side R10 faces toward the first end R31 of the runner R3. Each of the plurality of second stop barriers R2 has the second concave side R20, the second concave side R20 faces toward the second end R32 of the runner R3, and a side of the each of the plurality of second stop barriers R2 that is opposite to the second concave side R20 faces toward the first end R31 of the runner R3. The sealing structure Z is able to have the first inner layer unit 1 and the second inner layer unit 2 affixed between the first outer layer unit 3 and the second outer layer unit 4 through having the plurality of non-continuous patterns L4 formed thereon. Lengths of the first inner layer unit 1 and the second inner layer unit 2 respectively are the same, and the length of the first inner layer unit 1 is shorter than that of the first outer layer unit 3 or the second outer layer unit 4.

Moreover, the sealing structure Z can receive an external gas G through the supply channel P, and the external gas G can be delivered through the runner R3, such that the external gas G is filled in the at least one gas storing space S. The first inner layer unit 1 and the second inner layer unit 2 positioned in the at least one gas storing space S are pressed by the external gas G and cling to each other in a creased state along the runner R3, so as to be erected between the first outer layer unit 3 and the second outer layer unit 4, and to close the second end R32 of the runner R3.

Figure 3:
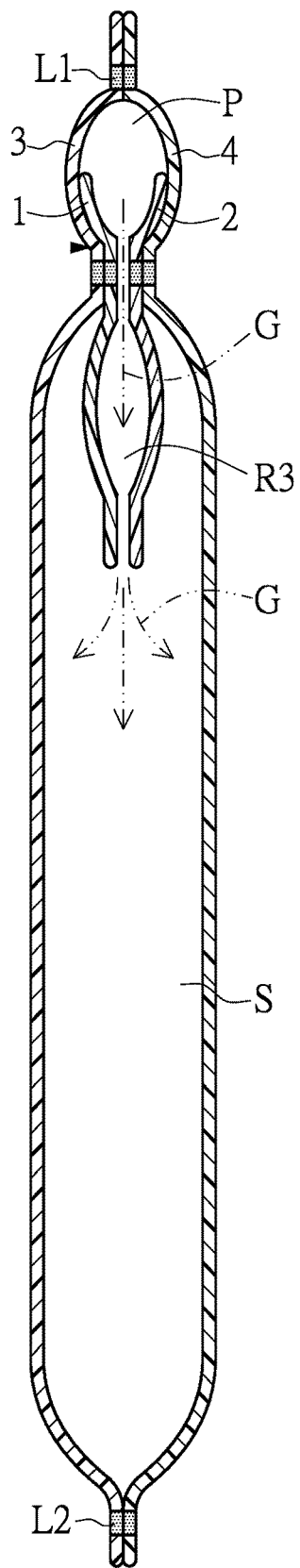
FIG. 3 is a cross-sectional schematic view of the sealing structure in the first embodiment of the present disclosure.
Figure 4:
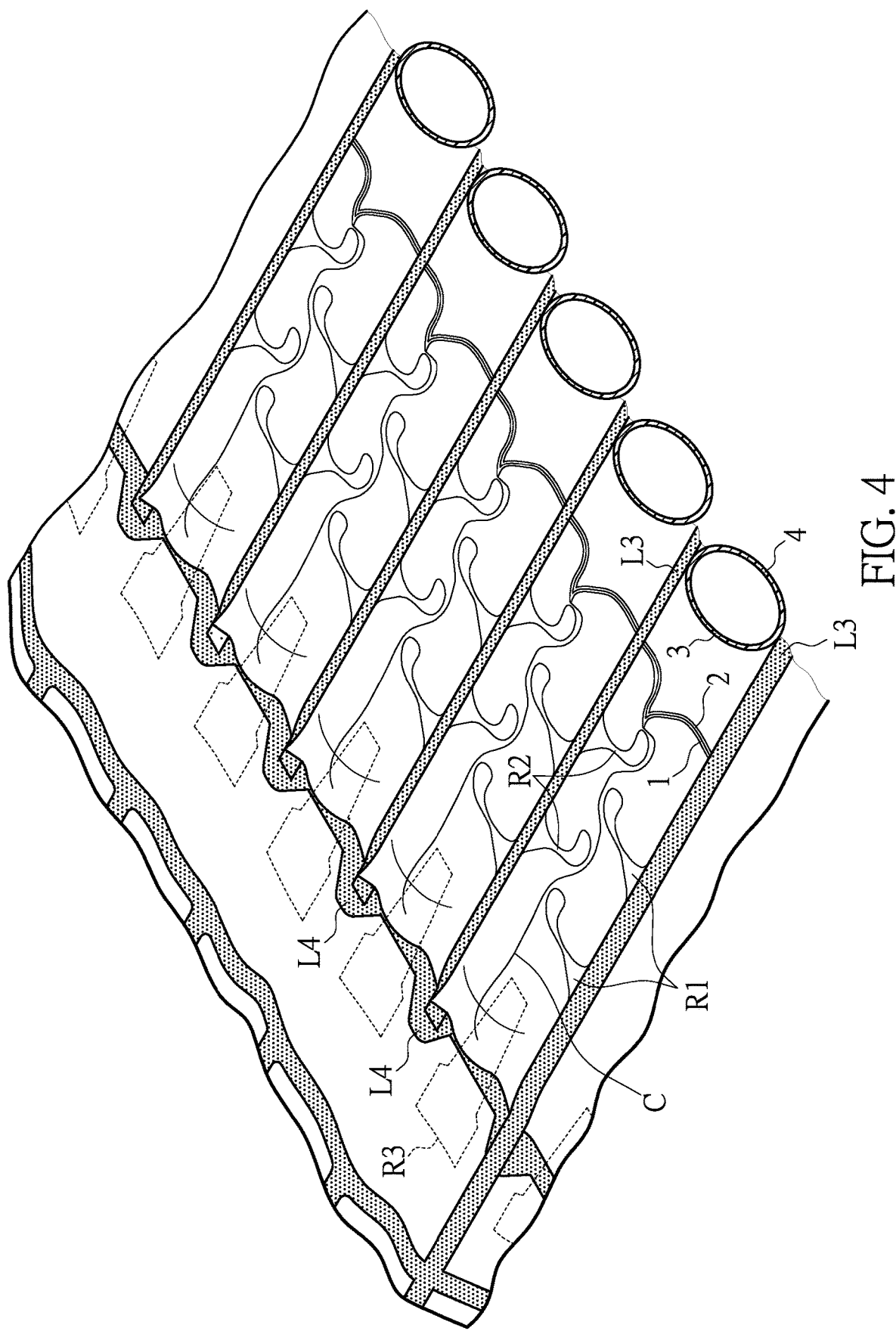
FIG. 4 is a schematic perspective view of the sealing structure in the first embodiment of the present disclosure.

For example, when the external gas G is delivered to the supply channel P, the external gas G can enter the runner R3 through the first end R31 of the runner R3, pass through the plurality of first stop barriers R1 and the plurality of second stop barriers R2, and enter the at least one gas storing space S through the second end R32 of the runner R3, so as to be filled in the at least one gas storing space S to form gas columns. When the external gas G is gradually filled in the at least one gas storing space S, the external gas G inside the at least one gas storing space S presses the first inner layer unit 1 and the second inner layer unit 2 (as shown in FIG. 3) such that the first inner layer unit 1 and the second inner layer unit 2 cling to each other to close the runner R3, and that the first inner layer unit 1 and the second inner layer unit 2 are erected between the first outer layer unit 3 and the second outer layer unit 4 without having any contact with the first outer layer unit 3 and the second outer layer unit 4. When the first inner layer unit 1 and the second inner layer unit 2 are pressed by the external gas G and therefore cling to each other, since the plurality of first stop barriers R1 and the plurality of second stop barriers R2 have a relatively hard structure and the runner R3 has a relatively soft structure, the first inner layer unit 1 and the second inner layer unit 2 can be bent and folded along the runner R3 to be in the creased state (as shown in FIG. 4), and the runner R3 forms a crease line C to prevent the external gas G from leaking.

Furthermore, when the first inner layer unit 1 and the second inner layer unit 2 are being pressed by the external gas G, such that the second end R32 of the runner R3 is gradually closed, a part of the external gas G in the at least one gas storing space S enters the runner R3 through the second end R32, and then enters and accumulates in the first retention space E1 along the first concave side R10 of the one of the plurality of first stop barriers R1 and/or along the second concave side R20 of the one of the plurality of second stop barriers R2. For example, before or at the time when the first inner layer unit 1 and the second inner layer unit 2 are being pressed by the external gas G and close the runner R3, a small part of the external gas G still enters the runner R3. Afterwards, the external gas G that enters the runner R3 through the second end R32 of the runner R3 flows toward the first end R31 of the runner R3. During the flowing process of the external gas G, the external gas G first flows to the second retention space E2 and then accumulates in the second retention space E2. When the second retention space E2 is fully filled with the external gas G, the external gas G that cannot be filled in the second retention space E2 then continues to flow toward the first end R31 of the runner R3, thereby flowing to the first retention space E1 and then accumulating in the first retention space E1.

Therefore, the sealing structure Z provided by the present disclosure utilizes the gas delivery structure R, the first retention space E1, and the second retention space E2 to reduce the leakage of the external gas G inside the at least one gas storing space S through the runner R3, so as to achieve the effect of reducing the gas from flowing to the outside.

It is worth mentioning that, in the sealing structure Z of the present disclosure, the plurality of first stop barriers R1 can be connected to the one of the plurality of interval patterns L3, and the first retention space E1 is formed between the first concave side R10 of each of the plurality of first stop barriers R1 and the one of the plurality of interval patterns L3. Moreover, the plurality of second stop barriers R2 can be connected to another one of the plurality of interval patterns L3, and the second retention space E2 is formed between the second concave side R20 of each of the plurality of second stop barriers R2 and the another one of the plurality of interval patterns L3.

Furthermore, each of the plurality of first stop barriers R1 and each of the plurality of second stop barriers R2 are in a meandering and irregular shape, or in a half-moon shape, and the plurality of first stop barriers R1 and the plurality of second stop barriers R2 are disposed upon one another in a staggered arrangement.

Figure 2:
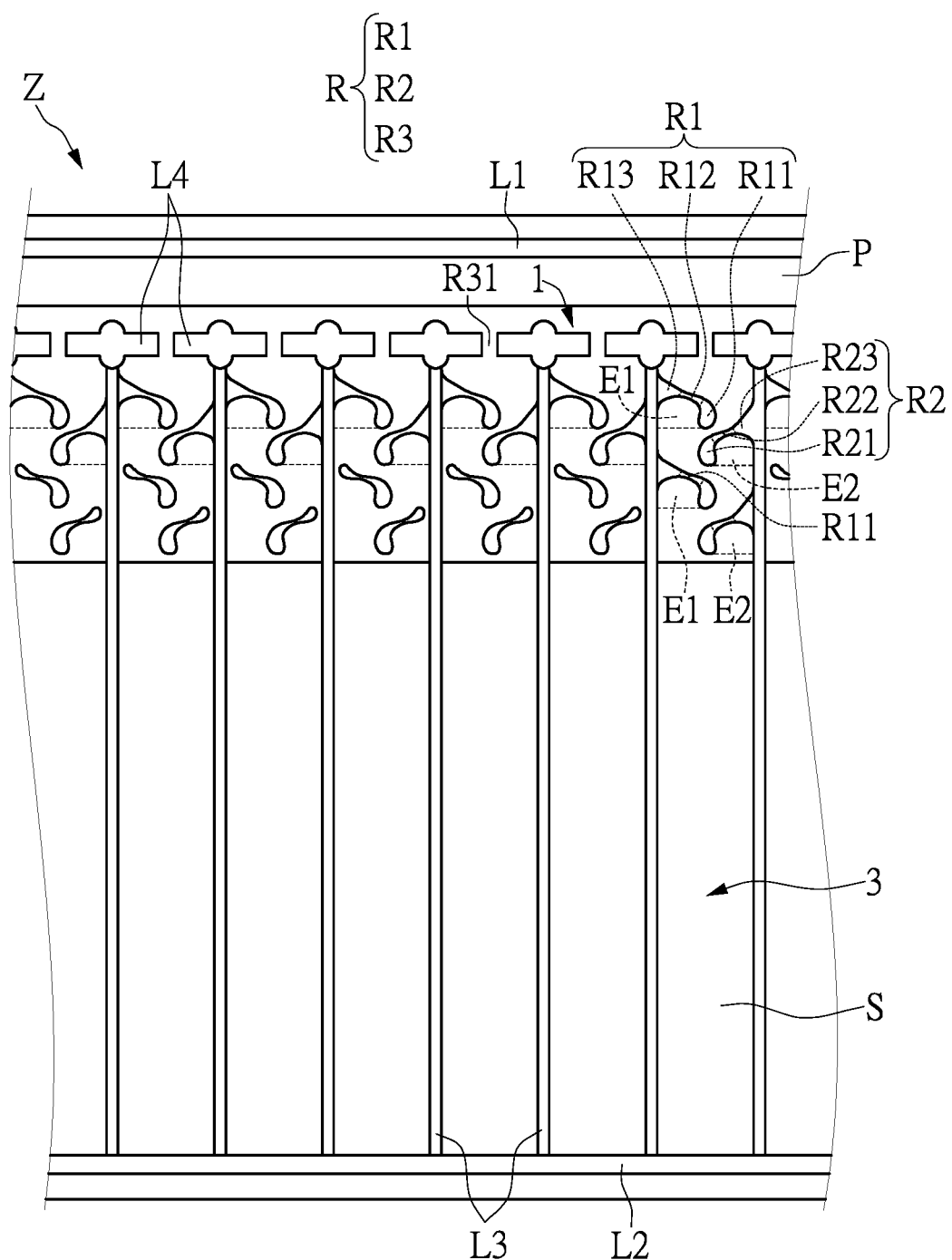
FIG. 2 is another structural schematic view of the sealing structure in the first embodiment of the present disclosure.

In addition, as shown in FIG. 2, each of the plurality of first stop barriers R1 includes a head end R11, a tail end R13 and a middle end R12 that connects the head end R11 and the tail end R13. Each of the plurality of second stop barriers R2 includes a head end R21, a tail end R23 and a middle end R22 that connects the head end R21 and the tail end R23. The head ends R11 and R21 can respectively be in a round, oval, or water droplet shape, the middle ends R12 and R22 can be in an arced shape. An area of each of the head end R11 and R21 is greater than an area of each of the middle end R12 and R22, and the area of each of the head end R11 and R21 is greater than or equal to an area of each of the tail end R13 and R23, but the present disclosure is not limited thereto.

Second Embodiment

Figure 5:
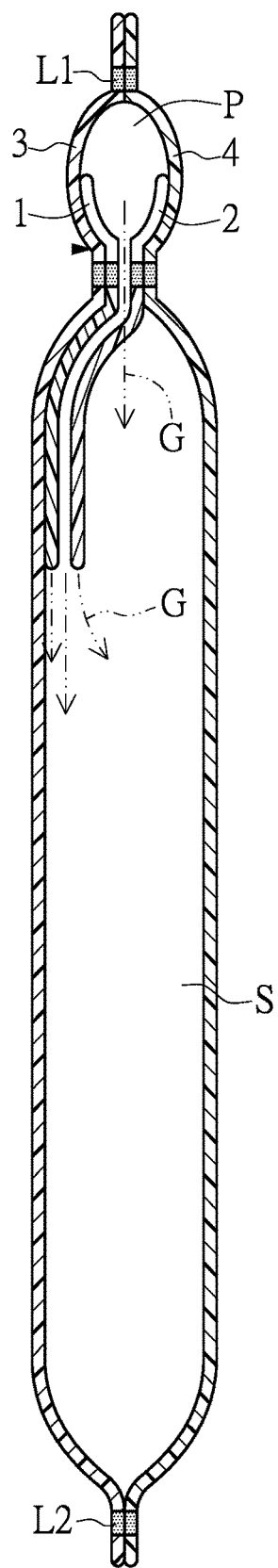
FIG. 5 is a cross-sectional schematic view of the sealing structure in a second embodiment of the present disclosure.
Figure 6:
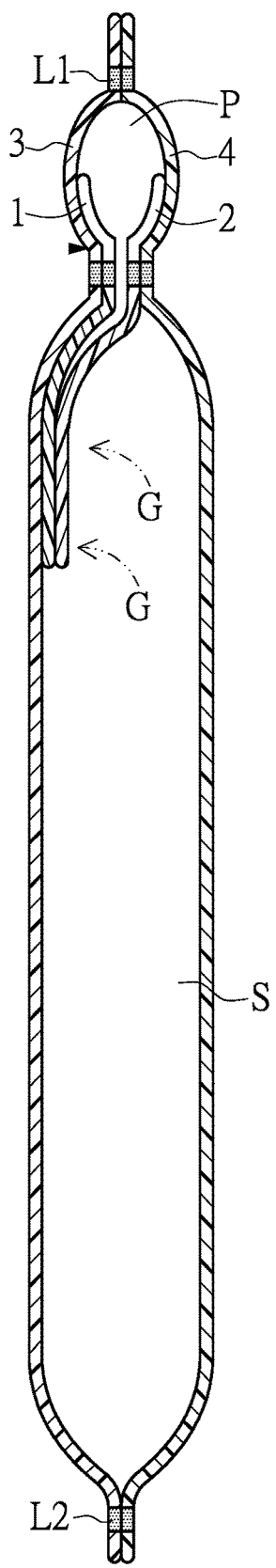
FIG. 6 is another cross-sectional schematic view of the sealing structure in the second embodiment of the present disclosure.

References are made to FIG. 5 and FIG. 6, and in conjunction with FIG. 1 to FIG. 4. As shown in the figures, in this embodiment, the first inner layer unit 1 and the second inner layer unit 2 are partially connected to the first outer layer unit 3 through the connection manner. When the at least one gas storing space S is fully filled with the external gas G, the first inner layer unit 1 and the second inner layer unit 2 in the at least one gas storing space S are pressed by the external gas G and cling to each other and are attached to the first outer layer unit 3.

For example, either one of the first inner layer unit 1 or the second inner layer unit 2 can be partially connected to the first outer layer unit 3. Therefore, when the external gas G is fully filled in the at least one gas storing space S, the external gas G in the at least one gas storing space S presses the second inner layer unit 2, as shown in FIG. 6, such that the first inner layer unit 1 and the second inner layer unit 2 cling to each other to close the runner R3, and the first inner layer unit 1 and the second inner layer unit 2 are bent and folded along the runner R3 to form the creased state, and are adjacent to the first outer layer unit 3.

Third Embodiment

Figure 7:
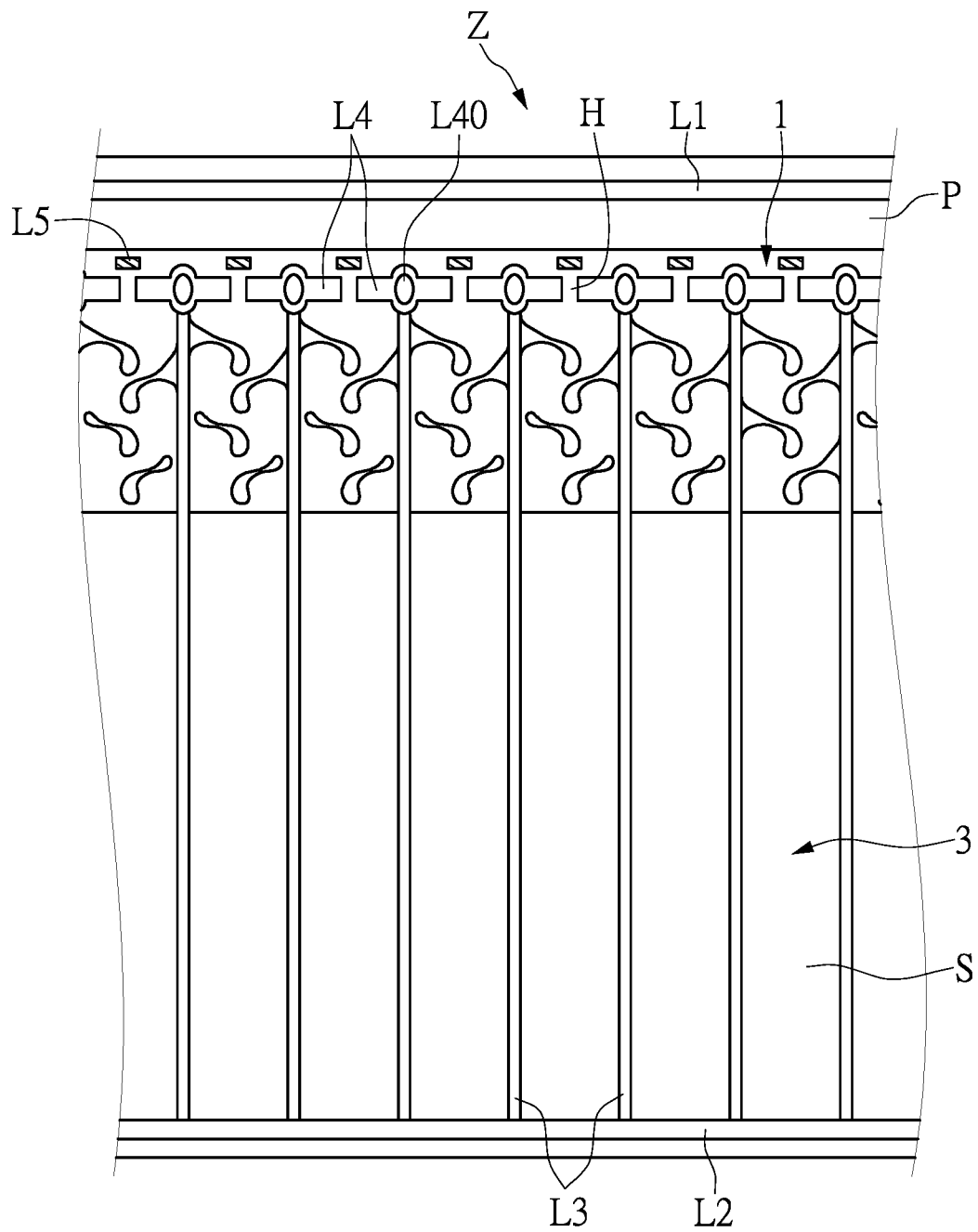
FIG. 7 is a structural schematic view of the sealing structure in a third embodiment of the present disclosure.
Figure 8:
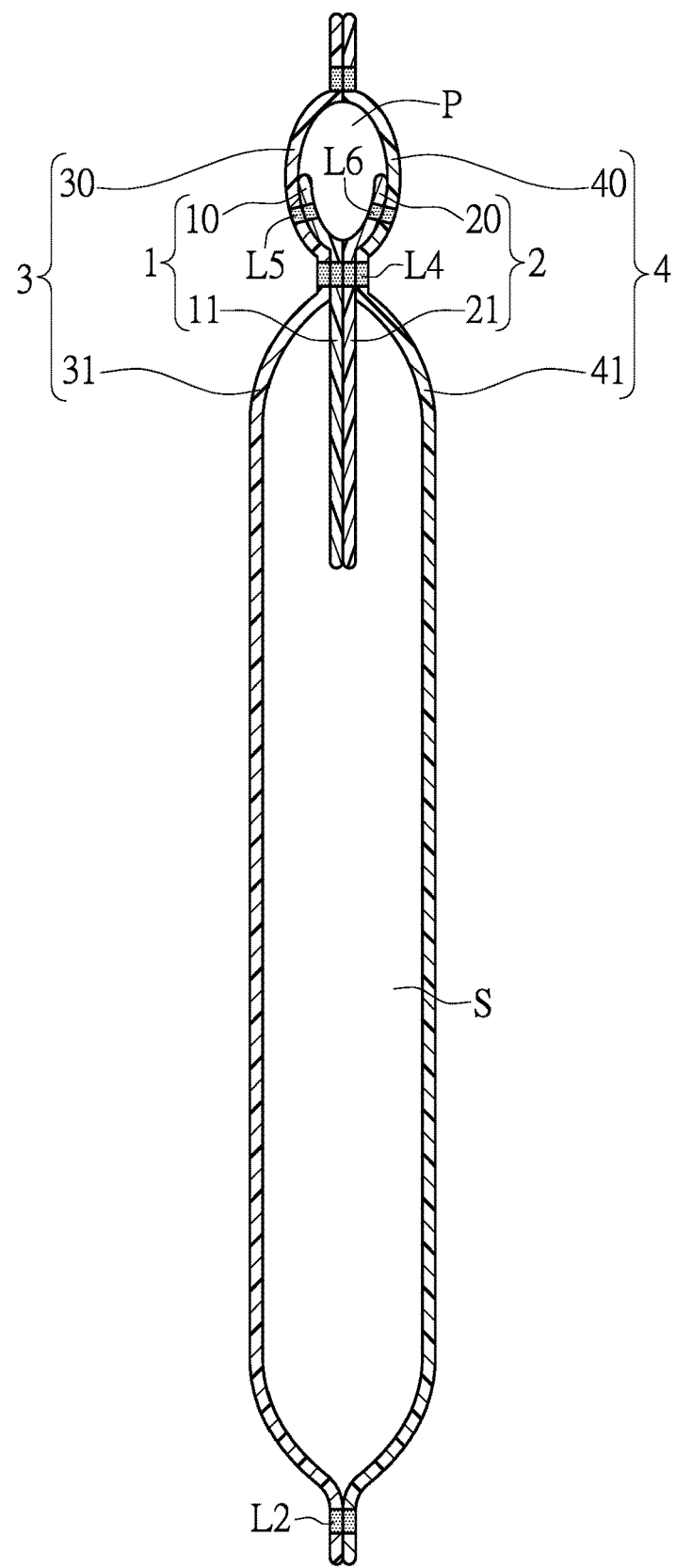
FIG. 8 is a cross-sectional schematic view of the sealing structure in the third embodiment of the present disclosure.

References are made to FIG. 7 and FIG. 8, and in conjunction with FIG. 1 to FIG. 6. As shown in the figures, in this embodiment, the first closed pattern L1 and the second closed pattern L2 are respectively positioned at one end of the first outer layer unit 3 and the second outer layer unit 4, the plurality of interval patterns L3 are positioned at intervals between the first closed pattern L1 and the second closed pattern L2 and connected to the second closed pattern L2, and the plurality of non-continuous patterns L4 are corresponding to the plurality of interval patterns L3 and adjacent to the first closed pattern L1. Each of the plurality of non-continuous patterns L4 is connected to the corresponding one of the plurality of interval patterns L3, and two of the plurality of non-continuous patterns L4 that are adjacent to each other form a delivery opening H, such that the supply channel P and the runner R3 are communicated with each other. For example, each of the plurality of non-continuous patterns L4 is connected to one of the plurality of interval patterns L3. Moreover, each of the plurality of non-continuous patterns L4 has a cushion part L40, and the cushion part L40 is a part of the plurality of non-continuous patterns L4 that is not connected through the above mentioned connection manner.

Moreover, the plurality of non-continuous patterns L4 divide the first inner layer unit 1 into a first upper inner layer part 10 and a first lower inner layer part 11, divide the second inner layer unit 2 into a second upper inner layer part 20 and a second lower inner layer part 21, divide the first outer layer unit 3 into a first upper outer layer part 30 and a first lower outer layer part 31, and divide the second outer layer unit 4 into a second upper outer layer part 40 and a second lower outer layer part 41. Lengths of the first upper inner layer part 10 of the first inner layer unit 1 and the second upper inner layer part 20 of the second inner layer unit 2 are shorter than lengths of the first upper outer layer part 30 of the first outer layer unit 3 and the second upper outer layer part 40 of the second outer layer unit 4, respectively. Lengths of the first lower inner layer part 11 of the first inner layer unit 1 and the second lower inner layer part 21 of the second inner layer unit 2, are shorter than lengths of the first lower outer layer part 31 of the first outer layer unit 3 and the second lower outer layer part 41 the second outer layer unit 4, respectively.

Furthermore, the first upper outer layer part 30 of the first outer layer unit 3 and the first upper inner layer part 10 of the first inner layer unit 1 are connected to each other through the connection manner to form a first affixing pattern L5, and the second upper outer layer part 40 of the second outer layer unit 4 and the second upper inner layer part 20 of the second inner layer unit 2 are connected to each other through the connection manner to form a second affixing pattern L6. For example, through the disposal of the first affixing part L5 and the second affixing part L6, the sealing structure Z of the present disclosure is able to prevent the first inner layer unit 1, the second inner layer unit 2, the first outer layer unit 3, and the second outer layer unit 4 from shrinking and forming creases, as well as preventing the first upper inner layer part 10 and the second upper inner layer part 20 from being closed, which is unfavorable for inflation.

One of the advantages of the present disclosure is that, through the abovementioned technical solutions, the sealing structure Z of the present disclosure is able to effectively control the gas flow in the runner R3 and prevent the external gas G in the at least one gas storing space S from having a backflow and leakage by including the gas delivery structure R formed by the first inner layer unit 1 and the second inner layer unit 2, the first retention space E1, and the second retention space E2. In addition, the plurality of first stop barriers R1 and the plurality of second stop barriers R2, which are formed by the first inner layer unit 1 and the second inner layer unit 2 through the afore-mentioned connection manner, have a hard structure, such that the creased state is formed and the runner R3 is closed when the first inner layer unit 1 and the second inner layer unit 2 are pressed by the external gas, and the first inner layer unit 1 and the second inner layer unit 2 can then be erected firmly and stably between the first outer layer unit 3 and the second outer layer unit 4.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sealing structure, comprising:
a first inner layer unit;
a second inner layer unit partially connected to the first inner layer unit through a connection manner, so as to form at least one gas delivery structure, wherein the at least one gas delivery structure includes a plurality of first stop barriers, a plurality of second stop barriers that are disposed in alternation with the plurality of first stop barriers, and a runner that is in contact with the plurality of first stop barriers and the plurality of second stop barriers;
a first outer layer unit adjacent to the first inner layer unit; and
a second outer layer unit corresponding to the first outer layer unit, and the second outer layer unit being partially connected to the first outer layer unit through the connection manner, so as to form a first closed pattern, a second closed pattern, a plurality of interval patterns and a plurality of non-continuous patterns; wherein the first outer layer unit and the second outer layer unit affix the first inner layer unit and the second inner layer unit between the first outer layer unit and the second outer layer unit through the plurality of non-continuous patterns, the first outer layer unit and the second outer layer unit form a supply channel through the first closed pattern and the plurality of non-continuous patterns, and the supply channel is communicated with a first end of the runner; wherein the first outer layer unit and the second outer layer unit form at least one gas storing space through two of the plurality of interval patterns that are adjacent to each other, one of the plurality of non-continuous patterns corresponding thereto, and the second closed pattern, and a second end of the runner is communicated with the at least one gas storing space; wherein one of the plurality of first stop barriers is connected to one of the plurality of interval patterns, a first concave side of the one of the plurality of first stop barriers and the one of the plurality of interval patterns form a first retention space therebetween, and the first concave side faces toward the second end of the runner; wherein one of the plurality of second stop barriers is connected to another one of the plurality of interval patterns, a second concave side of the one of the plurality of second stop barriers and the another one of the plurality of interval patterns form a second retention space therebetween, and the second concave side faces toward the second end of the runner.

2. The sealing structure according to claim 1, wherein the sealing structure receives an external gas through the supply channel, the external gas is delivered through the runner to be filled in the at least one gas storing space, and the first inner layer unit and the second inner layer unit that are positioned in the at least one gas storing space are pressed by the external gas and cling to each other in a creased state along the runner, so as to be erected between the first outer layer unit and the second outer layer unit and to close the second end of the runner.

3. The sealing structure according to claim 2, wherein when the first inner layer unit and the second inner layer unit are pressed by the external gas to gradually close off the second end of the runner, a part of the external gas in the at least one gas storing space enters the runner from the second end and accumulates in the first retention space along the first concave side of one of the plurality of first stop barriers, accumulates in the second retention space along the second concave side of one of the plurality of second stop barriers, or accumulates in the first retention space along the first concave side of one of the plurality of first stop barriers and accumulates in the second retention space along the second concave side of one of the plurality of second stop barriers simultaneously.

4. The sealing structure according to claim 2, wherein the first inner layer unit or the second inner layer unit are partially connected to the first outer layer unit through the connection manner, and when the at least one gas storing space is fully filled with the external gas, the first inner layer unit and the second inner layer unit in the at least one gas storing space are pressed by the external gas and cling to each other, and are attached to the first outer layer unit.

5. The sealing structure according to claim 1, wherein each of the plurality of first stop barriers and each of the plurality of second stop barriers are in a meandering and irregular shape or in a half-moon shape; wherein the plurality of first stop barriers and the plurality of second stop barriers are disposed upon one another in a staggered arrangement.

6. The sealing structure according to claim 5, wherein each of the plurality of first stop barriers and each of the plurality of second stop barriers include a head end, a tail end, and a middle end connecting the head end and the tail end; wherein the head end is of a round, oval, or droplet shape, the middle end is in an arced shape, an area of the head end is greater than an area of the middle end, and the area of the head end is greater than or equal to an area of the tail end.

7. The sealing structure according to claim 1, wherein the first closed pattern and the second closed pattern are respectively positioned at one end of the first outer layer unit and the second outer layer unit, the plurality of interval patterns are positioned at intervals between the first closed pattern and the second closed pattern and are connected to the second closed pattern, and the plurality of non-continuous patterns are corresponding to the plurality of interval patterns and are adjacent to the first closed pattern; wherein each of the plurality of non-continuous patterns is connected to a corresponding one of the plurality of interval patterns, and two of the plurality of non-continuous patterns that are adjacent to each other form a delivery opening, such that the supply channel and the runner are communicated with each other.

8. The sealing structure according to claim 1, wherein a length of the first inner layer unit is equal to a length of the second inner layer unit, and the length of the first inner layer unit is shorter than a length of the first outer layer unit or the second outer layer unit.

9. The sealing structure according to claim 8, wherein the plurality of non-continuous patterns divide the first inner layer unit into a first upper inner layer part and a first lower inner layer part, divide the second inner layer unit into a second upper inner layer part and a second lower inner layer part, divide the first outer layer unit into a first upper outer layer part and a first lower outer layer part, and divide the second outer layer unit into a second upper outer layer part and a second lower outer layer part; wherein lengths of the first upper inner layer part of the first inner layer unit and the second upper inner layer part of the second inner layer unit are shorter than lengths of the first upper outer layer part of the first outer layer unit and the second upper outer layer part of the second outer layer unit, respectively; wherein lengths of the first lower inner layer part of the first inner layer unit and the second lower inner layer part of the second inner layer unit are shorter than lengths of the first lower outer layer part of the first outer layer unit and the second lower outer layer part of the second outer layer unit, respectively.

10. The sealing structure according to claim 9, wherein the first upper outer layer part of the first outer layer unit and the first upper inner layer part of the first inner layer unit are partially connected to each other through the connection manner, so as to form a first affixing pattern, and the second upper outer layer part of the second outer layer unit and the second upper inner layer part of the second inner layer unit are partially connected to each other through the connection manner, so as to form a second affixing pattern.

* * * * *